March 23, 1965 W. KOHLHAGEN 3,175,110
SYNCHRONOUS REACTION MOTOR INCLUDING RESILIENT OUTPUT GEARING
Filed Oct. 19, 1960
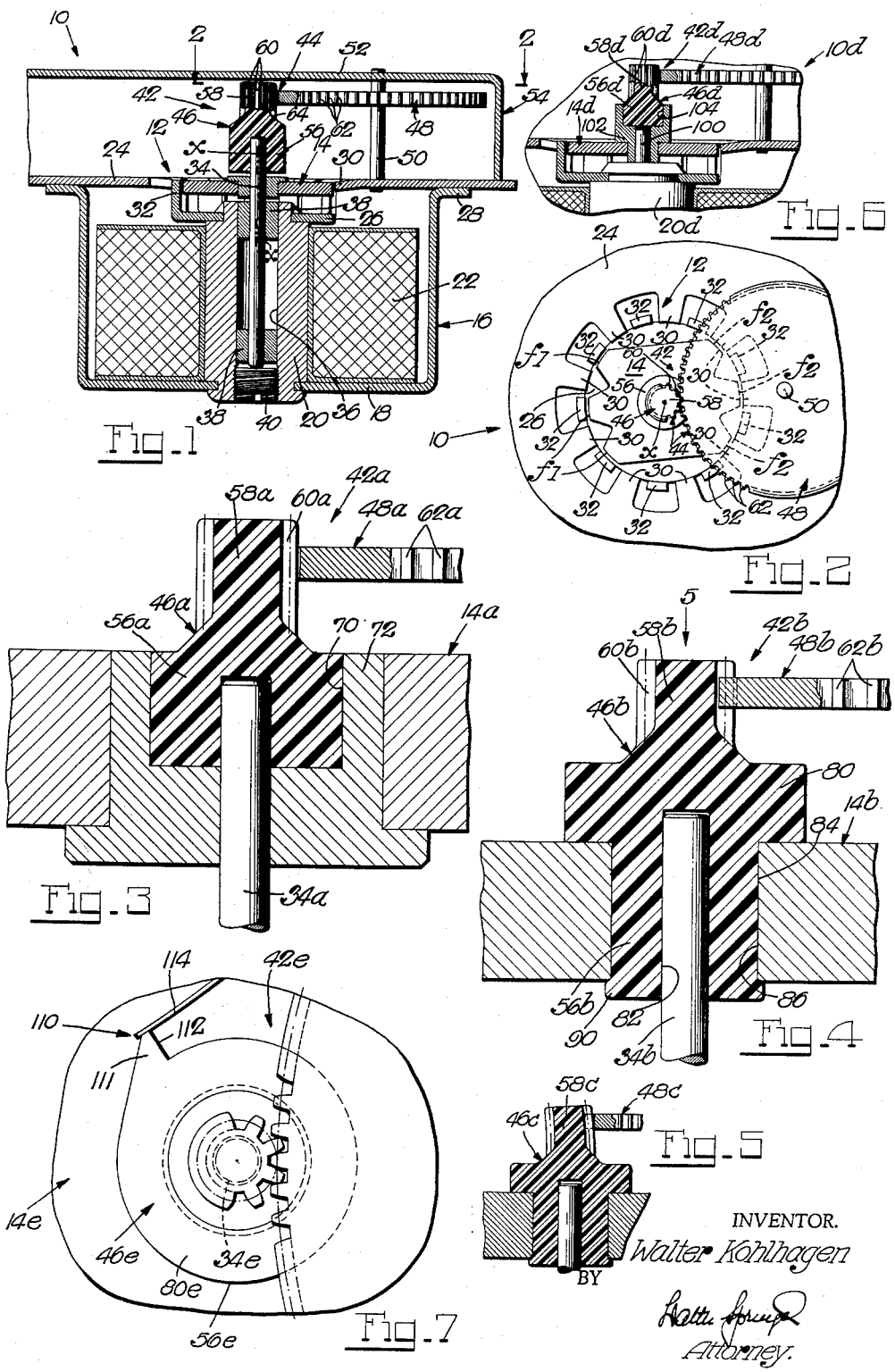
INVENTOR.
*Walter Kohlhagen*
BY
*Attorney.*

United States Patent Office 3,175,110
Patented Mar. 23, 1965

3,175,110
SYNCHRONOUS REACTION MOTOR INCLUDING RESILIENT OUTPUT GEARING
Walter Kohlhagen, Elgin, Ill., assignor to Amphenol-Borg Electronics Corporation, Delavan, Wis., a corporation of Delaware
Filed Oct. 19, 1960, Ser. No. 63,514
15 Claims. (Cl. 310—83)

This invention relates to synchronous reaction motors in general, and to mechanical drives of motors of this type in particular.

Motors of this type have a field which includes two sets of field poles of opposite instantaneous polarities that change in phase with the alternating current applied to the motor, and of which successive poles of one set characteristically alternate with successive poles of the other set in the circular disposition of all poles about a rotor axis, and a permanent-magnet rotor which is turnable about this axis and has pole faces that co-operate with the field poles in driving the rotor in synchronism with the current. The mechanical drive of this type of motor starts with the rotor and includes not only a pinion turnable therewith but in almost all cases also reduction gearing which is combined with the motor into a single unit and of which the rotor pinion is part of a first stage of usually several reduction stages.

While motors of this type are quite satisfactory in many respects, they leave much to be desired in the important matter of quiet performance. Thus, the noise which these motors generate is undesirable in any event, and can be quite annoying in motor applications where silent performance is of import, as in electric clocks for instance. This motor noise can frequently be heard even from a considerable distance and, hence, is objectionable especially, though not exclusively, in electric clocks which for this reason alone are considered to be of inferior quality by many. A predominant part of this noise has been found to emanate from the gear part of the motor drive, and in by far the largest part from the rotor pinion and the gear in mesh therewith regardless of whether the latter is part of a reduction gearing of a motor unit or a part of a load connectible with the motor. While previous attempts have been made to suppress this noise, these have been only partially successful or involved expediencies which were far too costly for their commercial adaptation.

The chief cause of this annoying noise is more or less inferior and mostly non-uniform running mesh between the rotor pinion and its companion gear, owing to a number of factors which are typical for motors of this type. Thus, the rotor shaft, by usually carrying the rotor and pinion on one side of its bearing and also driving the entire motor load thereat, will inevitably cause uneven wear on the bearing, with the result that this shaft will at its load end have movement in an orbital path about a fixed axis in addition to rotation about its own axis, with ensuing non-uniform mesh of the teeth of the pinion and companion gear at their pitchlines. Also, the rotor drive is of a characteristically fluttering nature due to the inherent constant variation of the magnetic forces betwen the rotor pole faces and field poles in the first place, and further due to different strength of individual rotor pole faces as well as inevitable tolerances in the shapes and coordination of the rotor pole faces and field poles, with ensuing more or less continuous clash between the teeth of the rotor pinion and companion gear within their necessary backlash freedom. This condition of fluttering rotor advance and ensuing clashing mesh of the rotor pinion and companion gear is further aggravated by inevitable and almost constant variations in the voltage of the applied line current to even the least of which the rotor responds in additional acceleration and deceleration. Non-uniform mesh between the rotor pinion and its companion gear is still further enhanced by their slightest eccentric mounting on their shafts and also by imperfections of individual teeth on either, as well as by their slightest relative displacement from a common plane of rotation. Correction of the above primary factors in inducing this annoying motor noise for the purpose of eliminating the latter would not only entail prohibitive cost but would indeed prove to be an impossible task.

It is the primary aim and object of the present invention to provide a motor of this type of which the mechanical drive component is so quiet in operation that practically no sound therefrom can be perceived even when held in closest proximity to the human ear, thus rendering the motor noiseless in operation for all practical intents and applications.

It is another object of the present invention to provide in a motor of this type a gear drive which is truly quiet in operation, yet requires neither more parts than used in conventional gear drives heretofore nor parts other than gears of simple spur type, and involves no more cost than the gear drives in prior motors of this type.

It is a further object of the present invention to introduce in the gear drive of a motor of this type resiliency in the mesh of at least the rotor pinion and its companion gear to compel their substantially uniform running mesh despite the aforementioned uncontrollable mesh-disturbing factors, and thereby eliminate the hitherto by far worst noise offender in motors of this type.

Another object of the present invention is to extend the aforementioned resiliency in the mesh of the rotor pinion and its companion gear into at least one of these drive elements beyond its teeth so as to extend the resilient action necessary to compel substantially uniform running mesh between both drive elements beyond these teeth and, hence, permit greater torque transmission between these elements without demeshing from each other as well as cause at the most inappreciable tooth wear of these drive elements.

A further object of the present invention is to extend the aforementioned resiliency in the mesh of the rotor pinion and its companion gear throughout at least one of these drive elements by making the same resilient throughout, thereby permitting optimum torque transmission between these elements without demeshing from each other and causing minimum tooth wear of these elements.

It is another object of the present invention to provide for the mount of the aforementioned resilient drive element at an axial distance from its area of mesh with the other drive element so that a part of this resilient element far larger than its teeth will readily respond not only in resilient torsion but also in resilient axial flexure to the aforementioned mesh-disturbing factors and compel substantially uniform mesh between these elements with the least flexure in the teeth of this resilient element for optimum uniformity of their running mesh with the teeth of the other element.

It is a further object of the present invention to form the aforementioned resilient drive element entirely of resilient and preferably moldable non-metallic rubber-like material for its most convenient and economical mass production and its adequate resiliency for the purpose in mind even at the smallest sizes, including rotor pinions, used in motors of this type, as well as for absence in the running mesh of this element with its companion drive element of the characteristic humming sound of meshing metal teeth.

Another object of the present invention is to arrange the aforementioned resilient drive element and its companion element to eliminate backlash between their teeth, and to arrange them even so that the resilient element will by the mere mesh of its teeth with those of the companion element be compelled into resilient axial flexure so slight as to put no noticeable load on the motor yet sufficient resiliently to back the resilient element against the companion element for most effective noise suppression yet and maximum torque transmission between those elements without demeshing.

A further object of the present invention is to provide a motor of this type with a directional drive control which obstructs wrong-directional drive of its self-started rotor and by rebound action reverses the same into its correct drive direction, with the aforementioned non-metallic resilient element being formed with an integral shoulder at which the rebound action occurs so as to render the directional drive control noiseless at all times as well as to obtain the benefit of the resiliency of this element in reversing the rotor with optimum force and life.

Other objects and advantages will appear to those skilled in the art from the following, considered in conjunction with the accompanying drawings.

In the accompanying drawings, in which certain modes of carrying out the present invention are shown for illustrative purposes:

FIG. 1 is a section through a motor unit having a mechanical drive embodying the present invention;

FIG. 2 is a fragmentary section through the motor unit as taken on the line 2—2 of FIG. 1;

FIG. 3 is an enlarged fragmentary section through a motor drive embodying the present invention in a modified manner;

FIG. 4 is an enlarged fragmentary section through a motor drive embodying the present invention in another modified manner;

FIG. 5 is a fragmentary section through a motor drive of modified application;

FIG. 6 is a fragmentary section through a motor drive embodying the present invention in a further modified manner; and FIG. 7 is an enlarged fragmentary plan view of a motor drive which includes a directional drive control also in accordance with the present invention.

Referring to the drawings, and more particularly to FIGS. 1 and 2 thereof, the reference numeral 10 designates a synchronous reaction motor having a field 12 and a rotor 14. The field 12 presently comprises a housing 16 of general cup shape to the bottom 18 of which is secured a center core 20, a field coil 22 in the housing 16 and surrounding the core 20, and outer and inner field plates 24 and 26 which are suitably secured to a top flange 28 of the housing 16 and to the top end of the center core 20, respectively. The outer and inner field plates 24 and 26 are provided with sets of inner and outer field poles 30 and 32, respectively, which are circularly arranged about a rotor axis $x$ and of which successive poles of one set alternate with successive poles of the other set in conventional manner.

The rotor 14 is carried by a shaft 34 which is rotatably mounted in the center core 20, the latter being to this end provided with a central aperture 36 for the reception of spaced bushings 38 in which the rotor shaft 34 is journaled and a threaded plug 40 which presently serves as a thrust bearing for the rotor shaft. The space in the core aperture 36 between the bushings 38 serves as an appropriate lubricant reservoir. The rotor 14 is a permanent magnet provided with pole faces $f1$ and $f2$ of opposite polarities.

In operation of the motor, alternating current is supplied to the field coil 22 to produce in the field poles 30 and 32 opposite instantaneous polarities which change in phase with the alternating current, with the rotor pole faces $f1$ and $f2$ cooperating with the field poles in driving the rotor in synchronism with the alternation of the current in a manner which is conventional with motors of this type.

The present motor 10 is also provided with a mechanical drive 42 comprising a gear train 44 and including the rotor 14. The gear train 44 is presently of reduction type of which there is shown only the first reduction stage in the form of a rotor pinion 46 and a companion gear 48. The pinion 46 is carried by the rotor shaft 34 and the gear 48 is carried by a shaft 50 which is suitably journalled with its opposite ends in the outer field plate 24 and in the bottom wall 52 of a gear cover 54. The shaft 50 may carry another gear of a next reduction stage which may be followed by one or more additional reduction stages (neither shown) under the cover 54 terminating in an output pinion for the drive of an intended utility device, such as a timing mechanism, for example. Of course, while the gear train 44 is presently combined with the motor into a single unit, the same could terminate at the rotor pinion 46, with the latter being connectible with a gear of the utility device to-be-driven by the motor.

In accordance with the present invention, the rotor pinion 46 is formed throughout of resilient non-metallic, and preferably moldable rubber-like material. Preferably, the rotor pinion 46 is molded of neoprene which is known for its toughness and high wear resistance as well as for its resiliency which is comparable to that of relatively soft rubber as desired for the intended purpose. The pinion 46 has presently a shank 56 by which it is mounted on the end of the rotor shaft 34, presently by being stretched thereon, and an axially continuing gear formation 58 of present spur-type the teeth 60 of which mesh with the teeth 62 of the companion gear 48. It will be noted in FIG. 1 that the teeth 60 of the rotor pinion 46, and particularly their region of mesh with the teeth of the companion gear 48, extend beyond and are axially spaced from the adjacent end of the rotor shaft 34, wherefore the gear formation 58 of the pinion has freedom resiliently to flex axially on its shaft mount. The gear formation 58 of the resilient pinion has also inherent freedom to respond to torque at its teeth in resilient torsion about its axis, even more so than if the rotor shaft 34 would extend into the axial confines of the gear formation 58.

This freedom of the gear formation 58 of the resilient pinion to act in resilient axial flexure as well as resilient torsion about its axis is highly significant in the matter of achieving uniform running mesh between the rotor pinion 46 and its companion gear 48 and, hence, eliminating the by far worst cause of offensive motor noise. Thus, no normally meshing the teeth of the rotor pinion 46 and companion gear 48 with the usual backlash between them, the resilient pinion will in resilient torsion respond to, and thereby absorb or wash out the effects of, the aforementioned factors which tend to cause clashing mesh between the teeth of these drive elements 46 and 48, and the resilient pinion will in resilient axial flexure further respond to, and thereby absorb or wash out the effects of, the aforementioned factors which tend to cause non-uniform mesh of the teeth of these drive elements at their pitchlines. As a result, the running performance of the pinion 46 and gear 48 is entirely without noise, and the sound emanating from the running motor unit has been found to be barely perceptible and then only on holding the motor unit against one's ear, with the slight sound left being entirely non-objectionable for motor applications of the most stringent requirements in the matter of quiet performance. The only sound left in the motor unit is the typical A.C. hum and the characteristic sound of the meshing metal gears in the remaining reduction stage or stages of the gear train 44, and such sound as the various known and applied directional drive controls will produce. Of these sounds, the A.C. hum is of low pitch and not at all irritating to the human ear, and the meshing sound of the metal gears in the rest of the reduction stages is not greatly unlike A.C. hum, and these sounds are of such low overall volume as to be perceptible to one's ear in closest proximity only to the motor unit, as already mentioned. As to the operational sound of a directional drive control, provisions to be described hereinafter and being within the scope of the present invention largely suppress, if not eliminate, this sound also.

The present rotor pinion 46 thus achieves to all practical intents and purposes noiseless performance of the motor unit as such, and of its gear drive in particular regardless of whether the latter has several reduction stages or terminates at the rotor pinion for connection there with a gear of a utility device-to-be-driven. The same advantage of noiseless performance is secured if the drive element 46 on the rotor shaft 34 is of gear-type rather than pinion-type in motor applications requiring no speed reduction or requiring speed step-up. Also, it is fully within the scope of the present invention to provide a non-resilient drive element on the rotor shaft 34 and to make the companion drive element resilient and mount it so that it may act in resilient axial flexure and resilient torsion to absorb or wash out the effects of the aforementioned factors which tend to cause non-uniform mesh between these drive elements.

The shank 56 of the present rotor pinion 46 is preferably of considerably larger diameter than the rotor shaft 34 so as to obtain a stretch mount of optimum firmness of the same on the latter. Also, the mount of the pinion 46 on the rotor shaft 34 solely with its shank 56 permits the formation of the gear formation 58 of the pinion at any desired pitch diameter larger or smaller than the diameter of the rotor shaft 34.

It follows from the preceding that due to the extension of the gear formation 58 of the rotor pinion 46 beyond the end of the rotor shaft 34, resilient pinion material far in excess of that of the mere pinion teeth 60 may freely respond in resilient torsion to tendencies of clashing mesh between the pinion and its companion gear, so much so that responding resilient torsion is by far the greater part confined to the pinion formation 58 inside of, rather than to, its teeth 60, with the result that the latter will under all operating conditions remain in normal, or nearly normal, mesh with the companion gear 48 and may for this reason safely transmit fairly high torque to the latter without demeshing therefrom. Ready control over the resilient response of the pinion formation 58, in torsion and axial flexure, to the mesh-disturbing effects of the aforementioned factors, is readily obtained on appropriate axial spacing of the mesh zone of the pinion 46 with the companion gear 48 from the base 64 of the pinion teeth 60. Influencing the resiliency in these respects of the pinion formation 58, and also facilitating the molding of the pinion 46 as well as lending it added strength, is the preferred tapered merger of the pinion shank 56 and gear formation 58 at the base 64 of the pinion teeth 60.

Reference is now had to FIG. 3 which shows a modified motor drive 42a that is different from the described motor drive 42 of FIG. 1 in that the present pinion 46a is mounted in a central recess 70 in a bushing 72 in the rotor 14a, with the latter being suitably mounted on the rotor shaft 34a. Thus, the shank 56a may be seated in the bushing recess 70 with a firm resilient pressfit which may even compress the shank 56a firmly against the presently therein projecting end of the rotor shaft 34a. The teeth 60a of the gear formation 58a of the pinion are in mesh with the teeth 62a of a companion gear 48a. Of course, the present resilient rotor pinion 46a has all the advantages of the described rotor pinion 46 of FIG. 1 insofar as noiseless performance of the motor is concerned. Additionally, the gear formation 58a of the present rotor pinion 46a projects a lesser amount beyond the nearest end of the rotor element than does the gear formation of the pinion 46 in FIG. 1, permitting the arrangement of the gear train 42a closer to the outer field plate of the present motor and the use of a correspondingly lower gear cover (neither shown) for a more condensed motor construction.

Reference is now had to FIG. 4 which shows another modified motor drive 42b. The present drive is similar to the described drive 42 of FIG. 1 in that the resilient pinion 46b is mounted on the rotor shaft 34b. However, the present drive 42b is different from both previously described drives 42 and 42a of FIGS. 1 and 3 in that the present rotor 14b is mounted on the rotor shaft 34b through intermediation of the shank 56b of the resilient pinion 46b. This difference is quite significant since the rotor 14b may dispense with the usual metallic bushing for its secure mount on the rotor shaft, the place of a metallic bushing being presently taken by the resilient shank 56b of the pinion 46b. The pinion shank 46b has presently at one end a collar formation 80 which rests on top of the rotor 14b and from which emerges the gear formation 58b of the pinion. The pinion shank 56b is provided with a central recess 82 for the reception of the rotor shaft 34b, and its outer periphery 84 is dimensioned for its reception in the central aperture 86 in the rotor 14b. The arrangement of the interfitted parts 34b, 56b and 14b is such that the pinion shank 56b is tightly compressed between the rotor shaft 34b therein and the rotor aperture 86 therearound. To this end, the outer diameter of the pinion shank 56b may be such that the latter may first be received with a light pressfit in the rotor aperture 86. On the other hand, the diameter of the central recess 82 in the pinion shank 56b may initially be smaller than the diameter of the rotor shaft 34b, sufficiently so that on forcing the pinion shank 56b with the rotor thereon onto the rotor shaft 34b the latter will tend to expand the resilient pinion shank which will in consequence be resiliently compressed against the rotor shaft and also against the rotor aperture 86 for a firm mount of the rotor 14b and pinion 46b on this shaft. Expansion of the free shank end 90 beyond the rotor 14b on forcing the pinion shank with the rotor thereon onto the rotor shaft is in no wise obstructed, and the expanded shank end 90 serves to lock the rotor 14b to the shoulder formation 80 on the pinion 46b for an even firmer rotor mount on the latter and, hence, also on the rotor shaft 34b. The teeth 60b of the pinion are in mesh with the teeth 62b of a companion gear 48b. The present resilient rotor pinion 46b also has all the advantages of the described rotor pinion 46 of FIG. 1 insofar as noiseless performance of the motor is concerned.

The arrangement of the rotor pinion in either of its forms 46, 46a and 46b of FIGS. 1, 3 and 4 so that the gear formation thereof may resiliently flex axially will also adapt the same for mesh with the companion gear without backlash between their teeth and without adding to the load on the motor, as will be readily understood. Such mesh without backlash between the teeth of the rotor pinion and companion gear is advantageous in that the pinion teeth will be subjected to the least resilient distortion from the teeth of the companion gear in transmitting the driving torque to the latter, wherefore the pinion teeth may safely transmit to the companion gear even higher torque without demeshing from the latter.

Taking into consideration inevitable tolerances in the spacing of the rotor pinion shaft from that of the companion gear, the by far simplest manner in which to achieve mesh between the teeth of the rotor pinion and companion gear without backlash between them is to mount these shafts at such distance from each other within normal tolerance that the gear formation of the pinion will be slightly resiliently flexed axially on mere mesh of its teeth with those of the companion gear, so that the mounted pinion has a permanent tendency resiliently to back against the mounted companion gear. This condition is shown in FIG. 5 in exaggerated fashion in which the gear formation 58c of the pinion 46c is axially resiliently flexed by virtue of its mesh with the companion gear 48c. This permanent resilient axial flexure of the gear formation 58c of the pinion, preferably so slight as to be hardly perceptible, is even advantageous since it affords most effective noise suppression yet and permits optimum torque transmission from the pinion to the companion gear without demeshing from the latter, without noticeably adding to the load on the motor.

While in the previously described motor drives the rotor pinion and rotor are carried by a journalled rotor shaft, noiseless performance of the motor in accordance with the present invention is also achieved if the pinion and rotor turn on a fixed shaft. Thus, FIG. 6 shows a motor 10d the rotor shaft 100 of which is fixed on the center core 20d. The rotor 14d is provided with a metal bushing 102 by means of which it is rotatably mounted on the shaft 100. The rotor bushing 102 is beyond the shaft 100 provided with a central recess 104 in which is resiliently pressfitted the shank 56d of the rotor pinion 46d the teeth 60d of which mesh with the teeth of the companion gear 48d.

Obviously, all the aforementioned factors, save orbital motion of a rotary rotor shaft, which tend to cause non-uniform mesh between the rotor pinion and companion gear and, hence, highly objectionable noise thereat, tend to do the same in the present pinion-to-gear drive, with these tendencies, however, counteracted by responsive resilient axial flexure and resilient torsion of the gear formation 58d of the present pinion 46d, wherefore the present motor drive 42d is fully as noiseless as the other described motor drives.

Reference is now had to FIG. 7 which shows a motor drive 42e that may in all respects be like that of FIG. 4, and additionally provides a directional drive control 110 which consists of an integral lug 111 with a shoulder 112 on the resilient rotor pinion 46e and of a companion element 114, presently in the simple form of a fixed spring finger which is urged with its free end against the pinion 46e. The shoulder 112 presently extends radially from the collar formation 80e on the shank 56e of the resilient pinion 46e. The rotor 14e of the present motor may be of self-starting type, but rotors of this type will self-start in either direction as is well known. The exemplary normal or correct drive direction of the present rotor 14e is counterclockwise (FIG. 7), and if the same should self-start in this direction its drive is not blocked, the spring finger 114 being then merely cammed out of the way by the lug 111 on each pass of the latter. However, if the rotor should self-start in clockwise direction, i.e., the wrong direction, the rotor will with its shoulder 112 run up against the adjacent end of the spring finger 114 and rebound therefrom into correct drive direction in well known manner.

Since the rotor pinion 46e is of non-metallic material which is relatively soft for its requisite resiliency and, hence, will not emit a perceptible sound on the described action of the spring finger 114 against it, be it on the normal drive of the rotor 14e or on a wrong-directional start of the same, it stands to reason that the present directional drive control 110 is noiseless in operation of the motor. The resiliency of the rotor pinion 46e, including its lug 111, is further advantageous in that the same is of added benefit in reversing the rotor with optimum force and life on a wrong-directional start of the same. However, the lug 111 on the pinion 46e, or at least that portion thereof which cooperates with the spring finger 114, is preferably located within the axial confines of the rotor shaft 34e so that the pinion will, on the clash of its shoulder 112 with the spring finger 114 on a wrong-directional self-start of the rotor, be subjected to resilient torsion but not to resilient axial flexure.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

What is claimed is:

1. In a synchronous reaction motor, the combination of a first rotor shaft and a second shaft; bearings for rotatably mounting said shafts, respectively, in spaced parallel relation with one of said shafts extending with one end beyond one end of its bearing; and two gear members on and turnable with said shafts and being in mesh with each other, the one gear member on said one shaft being throughout of non-metallic material of the resiliency of relatively soft rubber and so mounted on said one shaft end as to be at its mesh with the other gear member beyond and axially spaced from said one shaft end, so that said one gear member may, by resilient torsion about its axis and resilient axial flexure beyond said one shaft end, yield at its mesh with the other gear member.

2. The combination in a synchronous reaction motor as set forth in claim 1, in which said gear members are meshed without backlash.

3. The combination in a synchronous reaction motor as set forth in claim 1, in which said mounted shafts are so spaced that said one gear member is beyond said one shaft end axially resiliently flexed by its mesh with the other gear member to eliminate backlash between the teeth of said gear members.

4. In a synchronous reaction motor, the combination with a bearing and a shaft element carrying a rotor element with the shaft element being rotatably mounted in said bearing and extending with one end thereof and with the rotor element thereon beyond one end of said bearing; of a gear member throughout of non-metallic material of the resiliency of relatively soft rubber having teeth and being so mounted beyond said one bearing end on one of said elements as to be with an axial region of its teeth beyond and axially spaced from that end of both elements which is most remote from said one bearing end, so that said gear member may, by resilient torsion about its axis and resilient axial flexure beyond said most remote end of both elements, yield at its teeth over said region thereof.

5. The combination in a synchronous reaction motor as set forth in claim 4, in which said gear member is formed of neoprene.

6. The combination in a synchronous reaction motor as set forth in claim 4, in which said gear member has an axial shank by which it is mounted on said one element, and an axially continuing spur gear formation.

7. The combination in a synchronous reaction motor as set forth in claim 4, in which said rotor element has a central bushing mounted on said one end of said shaft element and being provided with a central recess, and said gear member has an axial shank and an axially continuing spur gear formation of which said shank is mounted in said bushing recess.

8. The combination in a synchronous reaction motor as set forth in claim 4, in which said gear member has an axially recessed shank and an axially continuing non-recessed spur gear formation, said rotor element has a central aperture in which the outer periphery of said shank is received, and said one end of said shaft element is received in said shank recess, with said shank being so tightly fitted between said aperture and shaft element as to be cross-sectionally compressed and solely supporting said rotor element and gear member on said shaft element.

9. The combination in a synchronous reaction motor as set forth in claim 8, in which said shank has next to said spur gear formation a shoulder bearing against one end of said rotor element, and said shank is of such length that a cross-sectionally non-compressed endlength thereof opposite said shoulder extends beyond the other end of said rotor element and locks the latter to said shoulder.

10. In a synchronous reaction motor, the combination of first and second shafts; a self-starting rotor carried by said first shaft; bearings for rotatably mounting said shafts, respectively, in spaced parallel relation with one of said shafts extending with one end beyond one end of its bearing; two gear members on and turnable with said shafts and being in mesh with each other, the one gear member on said one shaft having a shoulder and being of resilient non-metallic material throughout and so formed and mounted on said one shaft end as to be at its mesh with the other gear member beyond and axially spaced from said one shaft end so that said one gear member may by resilient axial flexure yield laterally at its mesh with the other gear member; and an element overriding said shoulder of said one gear member on the drive of the latter in the right direction but being in the path of said shoulder on a wrong-directional self-start of said rotor for rebound of said one gear member into the right drive direction.

11. The combination in a synchronous reaction motor as set forth in claim 10, in which said one shaft is said first shaft, and said one gear member has an axial shank and an axially continuing spur gear formation of which said shank is mounted on said one shaft end and provided with said shoulder.

12. In a drive, the combination of two shafts; bearings for rotatably mounting said shafts, respectively, in spaced parallel relation, with one of said shafts extending with one end beyond one end of its bearing; and two gear members on and turnable with said shafts and being in mesh with each other, the one gear member on said one shaft being throughout of non-metallic material of the resiliency of relatively soft rubber and so mounted on said one shaft end as to be at its mesh with the other gear member beyond and axially spaced from said one shaft end, so that said one gear member may, by resilient torsion about its axis and resilient axial flexure beyond said one shaft end, yield at its mesh with the other gear member.

13. The combination in a drive as set forth in claim 12, in which said one gear member is a molded part.

14. In a synchronous reaction motor, the combination with a rotatably mounted rotor shaft, of a rotor with a central aperture; and a member having a longitudinal axis and being throughout of non-metallic material of the resiliency of relatively soft rubber, with said member having spaced axial gear and shank formations about said axis and a hole concentric with said axis of which said shank formation is received in said rotor aperture and said shaft extends in said hole surrounded by said shank formation, with said aperture, shaft, shank formation and hole being so cross-sectionally dimensioned that said shank formation is tightly compressed against the shaft therein and surrounding rotor aperture and serves as the sole rotor support on said shaft.

15. The combination in a synchronous reaction motor as set forth in claim 14, in which said shank formation has next to said gear formation a shoulder bearing against one end of said rotor, and said shank formation is of such length that a non-compressed endlength thereof opposite said shoulder extends beyond the other end of said rotor and locks the latter to said shoulder.

References Cited in the file of this patent
UNITED STATES PATENTS

| | | |
|---|---|---|
| 2,541,790 | Sugden et al. | Feb. 13, 1951 |
| 2,883,840 | Geiger | Apr. 20, 1959 |
| 2,884,771 | Holt | May 5, 1959 |

OTHER REFERENCES

Machine Design, pp. 153–159, March 1954. (Copy in 74—801.)